US006453297B1

(12) United States Patent
Burks et al.

(10) Patent No.: US 6,453,297 B1
(45) Date of Patent: Sep. 17, 2002

(54) MEDICAL TRANSACTION SYSTEM

(75) Inventors: James L. Burks, Pendleton; Robert R. Schick; Sheila H. Schweitzer, both of Louisville, all of KY (US)

(73) Assignee: Athena of North America, Inc., Indianapolis, IN (US)

( * ) Notice: Subject to any disclaimer, the term of this patent is extended or adjusted under 35 U.S.C. 154(b) by 0 days.

(21) Appl. No.: 08/777,805

(22) Filed: Dec. 31, 1996

Related U.S. Application Data

(63) Continuation of application No. 08/147,156, filed on Nov. 2, 1993, now Pat. No. 5,644,778.

(51) Int. Cl.[7] .............................................. G06F 17/60
(52) U.S. Cl. .............................................. 705/3; 705/2
(58) Field of Search .......................... 705/2, 3; 707/4, 707/17, 505, 507, 522–524, 1, 10, 500; 395/200.15; 379/100.13; 235/375; 364/222.2, 224.5

(56) References Cited

U.S. PATENT DOCUMENTS

| 4,290,114 A | 9/1981 | Sinay ........................ 364/900 |
| 4,315,309 A | 2/1982 | Coli ........................... 364/200 |
| 4,319,225 A | 3/1982 | Klose ......................... 340/347 |
| 4,360,875 A | 11/1982 | Behnke ....................... 364/436 |
| 4,435,769 A | 3/1984 | Nagano et al. ............. 364/464 |
| 4,454,414 A | 6/1984 | Benton ....................... 235/379 |
| 4,491,725 A | 1/1985 | Pritchard ................... 235/375 |
| 4,553,206 A | 11/1985 | Smutek et al. ............. 364/200 |
| 4,648,037 A | 3/1987 | Valentino ................... 364/408 |

(List continued on next page.)

FOREIGN PATENT DOCUMENTS

| CA | 2081737 | 5/1993 |
| EP | 0297780 | 1/1989 |
| WO | 8401448 | 4/1984 |
| WO | WO 99/22330 | * 5/1999 |

OTHER PUBLICATIONS

Klingman et al., "Outcomes of Surgery Under Medicaid", Health Care Financing Review, v11, n3, p1 (16), Spring 1990, (Dialog file 149, Accession No. 01241720).*
Elizabeth Romo, Adapting to the ANSI 835 transaction set, Healthcare Financial Management, vol. 47, No. 1, Jan. 1993, US, pp. 54–56.

Primary Examiner—Frantzy Poinvil
(74) Attorney, Agent, or Firm—Wood, Herron & Evans, L.L.P.

(57) ABSTRACT

A medical transaction system is disclosed which is capable of permitting a plurality of healthcare providers to communicate with a plurality of payors and financial institutions. The healthcare providers, payors, and financial institutions do not have to communicate in the same data message formats nor in the same communication protocols. Such a system facilitates not only the processing of medical claims submitted by the healthcare providers to the payors, but also permits the transfer of medical data records between healthcare providers. The system supports the processing of medical claims without requiring a centralized database or imposing a uniform claim format on the healthcare providers and payors. The preferred embodiment of the invention further includes a financial transactor that uses remittance information from the payors to generate the electronics funds transfer messages to credit and debit accounts. Additionally, the system supports a medical line of credit at financial institutions that may be used to pay portions of medical claims not covered by payors.

39 Claims, 7 Drawing Sheets

U.S. PATENT DOCUMENTS

| | | |
|---|---|---|
| 4,667,292 A | 5/1987 | Mohlenbrock et al. ..... 364/406 |
| 4,858,121 A | 8/1989 | Barber et al. ................ 364/406 |
| 4,926,415 A | 5/1990 | Tawara ....................... 370/600 |
| 4,951,196 A | 8/1990 | Jackson ....................... 364/401 |
| 4,987,538 A | 1/1991 | Johnson et al. ............. 364/401 |
| 5,021,995 A | 6/1991 | Quint et al. ................. 364/900 |
| 5,070,452 A | 12/1991 | Dovie, Jr. et al. .......... 364/401 |
| 5,072,383 A | 12/1991 | Brimm et al. ......... 364/413.02 |
| 5,136,502 A | 8/1992 | Van Remortel et al. ..................... 364/413.01 |
| 5,202,977 A | 4/1993 | Pasetes et al. .............. 395/500 |
| 5,235,702 A | 8/1993 | Miller ......................... 395/600 |
| 5,239,622 A | 8/1993 | Best et al. ................... 395/117 |
| 5,239,662 A | 8/1993 | Danielson et al. .......... 395/800 |
| 5,247,520 A | 9/1993 | Geise et al. ................ 370/94.1 |
| 5,251,314 A | 10/1993 | Williams .................... 395/600 |
| 5,265,239 A | 11/1993 | Ardolino ..................... 395/500 |
| 5,568,489 A | 10/1996 | Yien et al. ................ 370/110.1 |
| 5,608,874 A | 3/1997 | Ogawa et al. ......... 395/200.15 |
| 5,659,741 A | 8/1997 | Eberhardt .................... 395/615 |
| 5,995,939 A * | 11/1999 | Berman et al. ................. 705/3 |

* cited by examiner

MEDICAL TRANSACTION SYSTEM

This is a continuation application of application Ser. No. 08/147,156, now U.S. Pat. No. 5,644,778 filed on Nov. 2, 1993 of JAMES L. BURKS, ROBERT R. SCHICK and SHEILA H. SCHWEITZER, for MEDICAL TRANSACTION SYSTEM.

FIELD OF THE INVENTION

This invention is related to computer systems used in the medical health industry, and more particularly, to computer systems used to communicate medical insurance claims.

BACKGROUND OF THE INVENTION

Computer systems have been used for a variety of functions within the medical health industry. For example, computer systems have been used to submit, adjudicate, and process medical insurance claims. Another example is the use of a computer system to provide medical history information to a healthcare provider so the provider can make an informed diagnosis or prognosis.

The medical claim processing systems typically include a plurality of computer stations coupled to a central processing computer. The computer stations are typically located at a healthcare provider's facility, an insurance carrier, or medical laboratory. The computer stations generate a request for medical information or a medical claim for processing. The central processing computer couples the computer stations together and verifies the communication with the stations, processes the requests for data, and communicates the requested information back to the computer stations.

Several limitations exist for this type of computer system. First, these systems require that the plurality of computer stations communicating with the central processing system communicate in a particular communication protocol and that all of the messages communicated with the central processing system have the same predefined format. The requirement that the computer stations all communicate in the same format with the same protocol does not permit expansion of the system to users that are currently using other programs in their computer stations that format data messages differently or that use communication protocols other than the one used by the central processing system. Modifications must be made to the programs of the new users so they may communicate with the central processing system correctly. What is needed is a medical computer system that can communicate with a plurality of data message formats and communication protocols.

A second limitation of a typical medical transaction system is a requirement that the central processing system validate and process all the data messages received from the computer stations. In order to do so, the central processing system must be able to compare the received data messages against known acceptable data. For example, U.S. Pat. No. 4,858,121 to Barber et al., discloses a central processing system that interfaces with a plurality of physician office terminals, financial institutions, and insurance companies. The information required to validate and format the flow of data from a standardized physician's terminal to the central processing system of this patent is provided in the claims, insured, physician, insurance company, zip code, bad credit card, and insurance check files associated with a variety of databases at the central processing system. The information in these files must be provided by a plurality of insurance carriers and employers that receive electronic claims from the central processing computer. As a consequence, the maintenance and updating of these databases with information from the insurance carriers and employers must be performed at the central processing system. What is needed is a system that does not require a centralized database for validating and formatting an electronic medical claim that must be maintained with insurance carrier data.

Another limitation of systems previously known include the requirement that the central processing system transmit medical claims to insurance carriers and receive remittance data from insurance carriers in the same communication format and protocol used by the computer stations at the insurance carriers. In an effort to standardize both forms of communication, ANSI (American National Standards Institute) has generated an ANSI 837 standard for medical claims and an ANSI 835 for remittance data that specifies the format for a variety of message types that contain the various types of information to be exchanged among the central processing system and the computer stations within a typical computer system used in the healthcare industry. One limitation of the ANSI standards, however, is that a number of data fields in the data messages specified by the standard are optional and may or may not be used by one or more of the insurance carriers that are members of a medical claim processing system. Typically, insurance carriers, sometimes called trading partners, contract with a business partner who runs a central processing system to provide the carrier with the electronic medical claims from the healthcare providers. Although the optional data fields provided in the message formats specified by the ANSI standards support different variations within the standard, the ANSI 837 data message format in previously known systems are set by the business partner so all computer stations communicate with the central processing system in the same data message format. What is needed is a system that can communicate with a plurality of trading partners that supply data messages in different formats and in different communication protocols.

In previously known systems, the insurance carriers may or may not provide remittance information to the central processing system so the central processing system can generate electronic funds transfer messages to financial institutions. Instead, the insurance carriers may generate hard copy checks that are mailed to the financial institutions or may adjudicate the claim and transmit the remittance of the claim to the central processing system which in turn generates electronic funds transfer messages in the same format for the financial institutions. As a consequence, only the insurance carrier has access to all of the remittance data that may be used to generate a database of remittance information regarding the payment of the medical claims by the insurance carrier. Periodically, an insurance carrier may provide the database of remittance information to a third party for statistical analysis to determine data such as the most frequent type of treatment for a particular demographic group or geographical location. Such statistical information is useful to the insurance carrier for identifying growing healthcare costs which may need addressing. Currently, each insurance carrier must generate its own remittance database and the statistical analysis of the database is performed off-line in a non-real time manner. What is needed is a system that can generate a remittance database for all of the claims adjudicated by all of the insurance carriers within a medical computer system and analyze that information.

All previously known medical computer systems are dedicated to a single function such as providing medical healthcare data records such as treatments and diagnosis to healthcare providers or submitting and adjudicating medical healthcare claims. What is needed is a medical transaction computer system that is capable of integrating the functions of obtaining medical data records with the function of medical healthcare claim processing.

The present invention provides a medical transaction system that overcomes the problems noted with the previously known medical computer systems.

SUMMARY OF THE INVENTION

The above-identified problems for previously known medical computer systems are solved by a unique medical transaction system that communicates with a plurality of healthcare provider computer stations and a plurality of insurance carrier and financial institution (trading partner) computer stations in a variety of communication protocols and data message formats. One embodiment of the inventive medical transaction system includes a communication receiver capable of communication with the plurality of healthcare provider computer stations using a variety of communication protocols and data message formats, a compiler for compiling information from the data messages transmitted by the healthcare provider computer stations, the compiled information being put in generic records having a format that is independent of the communication protocol and format of the data messages, an extractor for extracting some of the generic records associated with a trading partner computer station identification code, a formatter for formatting message information from the extracted generic records in a format corresponding to the trading partner computer station identification code, and a communications transmitter for transmitting the formatted message information to a trading partner in a communication protocol and data message format recognized by the trading partner.

Such a transaction system is capable of communicating with the healthcare provider, insurance carrier, and financial institution computer stations in any one of a variety of communication protocols and data message formats. For example, doctors and hospitals may submit medical claims to the transaction system without the claims having to be communicated in the same data message format or transmitted in the same communication protocol. Accordingly, there is no need for a healthcare provider station desiring to become a member of the medical transaction system to modify any of its hardware or software to communicate with the medical transaction system of the present invention.

Similarly, the medical transaction system of the present invention may communicate data messages containing claim information to a variety of insurance carriers without the insurance carriers all using the same data message formats and communication protocols. This advantage permits the operator of the medical transaction system to contract with any financial institution or insurance carrier for a format predetermined by a trading partner agreement that meets the needs of one trading partner without impacting communication or data format requirements for another trading partner. Thus, any financial institution or insurance carrier signing a trading partner agreement with the operator of the medical transaction system need not modify the format of its existing data messages or communication protocols.

In the above-identified system, the data files and databases required to adjudicate medical claims are kept at each of the respective insurance companies. Thus, there is no need for a centralized database having specific insurance carrier information at the medical transaction system for processing a medical claim. One advantage of moving this function to the trading partner computer stations is that the medical transaction system can quickly and efficiently verify the data fields within the data messages communicated to it without requiring the extensive information and overhead processing required to adjudicate and process medical claims. Another advantage is that information to maintain a centralized database for validating claims is not required from the insurance carriers.

Another embodiment of the unique medical transaction system of the invention includes the capability of receiving data messages which include adjudicated claim and remittance information from the computer stations at the insurance carriers. The medical transaction system of this embodiment further includes a financial transactor that processes the remittance information to generate electronic funds transfer messages that may be transmitted to the financial institutions to transfer money from an insurance carrier account to a healthcare provider account. The compiler of this embodiment further includes the capability to compile information from the remittance and electronic funds transfer messages and associate the compiled information with the generic records in the database generated from the medical data requests. Thus, the medical transaction system can generate a database from the medical transaction requests, the remittance messages, and the electronic funds transfer messages. This database may be statistically analyzed off-line or in a real time manner.

Another embodiment of the medical transaction system includes the capability of healthcare providers to communicate with other healthcare providers as well as the trading partners. In this type of system, the healthcare provider may request medical data records of a patient in order to properly diagnose or prescribe a treatment for a patient's condition. The transaction request for medical data records is routed through the medical transaction system to the appropriate medical data record source, such as another healthcare provider. The medical data record source, in response, provides medical data records to the requesting healthcare provider station through the medical transaction system. This embodiment of the medical transaction system handles this type of medical data record transactions along with the medical claim transactions previously discussed. Thus, this embodiment of the invention provides a medical transaction system that integrates the function of providing medical data records with the function of processing medical healthcare claims.

Other advantages of the present invention will become apparent to those of ordinary skill in the art upon reading and understanding the following detailed description.

BRIEF DESCRIPTION OF THE DRAWINGS

The present invention may take form in various components and arrangement of components and in various steps and arrangement of steps. The drawings are only for purposes of illustrating a preferred embodiment and alternative embodiments and are not to be construed as limiting the invention.

DETAILED DESCRIPTION

Figure 1:
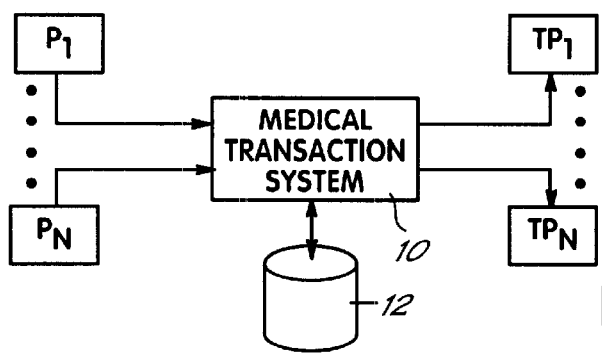
FIG. 1 is a block diagram of an alternative embodiment of the inventive medical transaction system.

The medical transaction system 10 of FIG. 1 shows an embodiment of the invention that interfaces with a plurality of healthcare provider computer stations, $P_1$ through $P_N$, and a plurality of trading partner computer stations, $TP_1$ through $TP_N$. Each of the healthcare provider terminal stations are located in a doctor's office, hospital, or the like and is typically used to generate medical claims for the treatment of patients. Computer stations $P_1$ through $P_N$ may also be located at submitter or biller sites where medical claims are typically collected and submitted to the system 10 in batch form or in real time. The claims are submitted to payors such as insurance carriers and governmental agencies that comprise a subset of the computer stations $TP_1$ through $TP_N$. The healthcare provider stations do not provide the claim information to the medical transaction system 10 in the same data message format nor do all of the healthcare provider stations communicate with the medical transaction system in the same communication protocol. Likewise, the medical transaction system 10 does not communicate with all of the trading partner computer stations in the same data message format nor in the same communication protocol. A communication receiver and transmitter are provided within medical transaction system 10 to support the plurality of data message formats and communication protocols needed to communicate with the healthcare provider and trading partner computer stations. The communication transmitter and receiver are discussed in more detail below.

In response to receipt of a medical claim from a healthcare provider station, medical transaction system 10 reorganizes the information from the received medical claim into a generic medical claim record format. These generic medical records may be stored in the memory of the medical transaction system or organized in a generic transaction database 12 associated with the system. The medical transaction system 10 may periodically extract generic medical records that correspond to one of the trading partners. These extracted data records are formatted in a format that corresponds to a computer identification code that corresponds to a trading partner. Typically, the data message format for the formatted generic records are stipulated in a contractual agreement between the operator of the medical transaction system and each of the trading partners. The communication transmitter of the system 10 transmits, in the communication protocol recognized by that trading partner, the formatted data messages to the trading partner corresponding to the computer station identification code. For example, system 10 may, at 10:00 p.m. each evening, extract all the generic medical records received for a day that represent claims for a particular insurance company, such as a Blue Cross/Blue Shield affiliate, format the records and send them to the Blue Cross/Blue Shield affiliate for adjudication.

The system of FIG. 1 provides several advantages over the previously known medical computer systems. Firstly, medical transaction system 10 is capable of receiving a medical claim from a plurality of healthcare providers or subscriber sites that use computer stations supporting different medical claim formats and different communication protocols. For example, a doctor may submit a claim for a patient's visit and a hospital may submit a claim for extended care at its facility, even though the hospital and doctor use different computers that format data messages differently and communicate in different protocols. The submission of the medical claims may also be done in batch form or in a real time manner. Secondly, medical transaction system 10 not only receives the medical claim information in a multitude of formats and protocols but also organizes the data in the received data messages to create generic records which contain the medical claim information. These generic records facilitate the organization of a generic transaction database 12 and the extraction of the generic records for transmission to a trading partner. Thirdly, each of the insurance carrier trading partners maintains its own databases for adjudicating the claims it receives from system 10. Thus, there is no requirement for system 10 to have a centralized database having specific insurance carrier information for processing or adjudicating medical claims.

Figure 2:
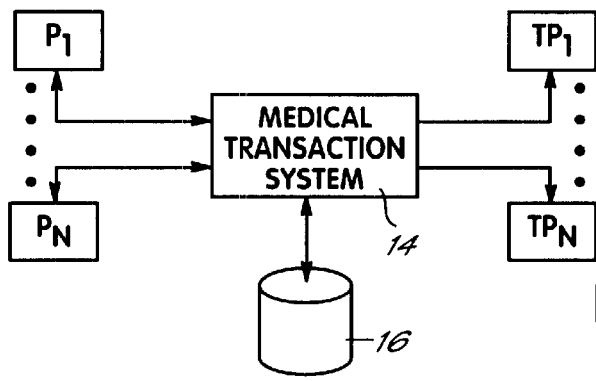
FIG. 2 is a block diagram of another alternative embodiment of the inventive medical transaction system.

Another embodiment of the medical transaction system 10 is shown in FIG. 2. This medical transaction system 14 includes the capabilities of the system shown in FIG. 1 and preferably includes a generic transaction database 16. Additionally, the medical transaction system of FIG. 2 includes a verifier to verify the type of data within the data fields of the data messages received from the healthcare provider computer stations. This verification preferably includes confirming whether the type of data within a data field of the received message is correct. For example, the verifier may check whether the data in a particular data field is character or numeric data. Other simplistic verification of the data that does not require historical information is also contemplated. For example, the verifier may determine that a hysterectomy for a male patient is an erroneous claim. If an erroneous claim is received, an error message may be generated that is supplied to the communication transmitter of system 14 which in turn transmits the error message to the healthcare provider station that sent the erroneous claim. The error message is formatted in the data message format corresponding to the computer station identification code for the station that sent the erroneous claim. The communication transmitter transmits the formatted error message in the correct communication protocol for the healthcare provider station. The system of FIG. 2 provides the advantage of informing a healthcare provider that a medical claim has not been received correctly.

The medical transaction system of FIG. 2 also includes a compiler that generates a generic record that contains identifying information regarding a data message received from a healthcare provider that failed verification testing. The system of FIG. 2 also includes an analyzer that generates statistical data from the data in the generic records of the database 16. This statistical data may include which healthcare providers are submitting the most claims, the types of claims being submitted, and the average dollar amount of the submitted claims. Of course, other types of statistical information could be determined from the data in generic transaction database 16.

Figure 3:
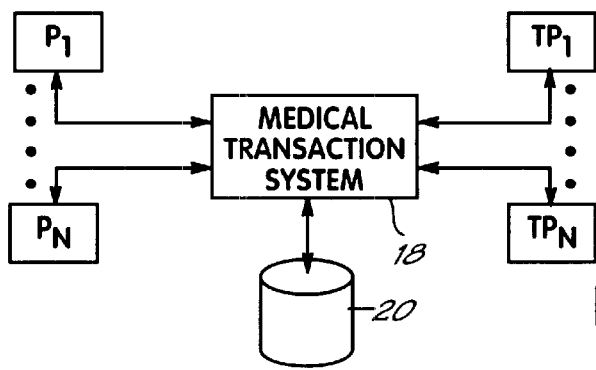
FIG. 3 is a block diagram of a preferred embodiment of the medical transaction system.

A medical computer system that uses a preferred embodiment of the medical transaction system 10 is shown in FIG. 3. System 18 includes the ability to bidirectionally communicate with the healthcare provider stations, $P_1$ through $P_N$, like the system in FIG. 2, as well as a bidirectional communication capability with the trading partners, $TP_1$ through $TP_N$. The medical transaction system 18 shown in FIG. 3 further provides communication from one healthcare provider to another. Thus, system 18 may be used to communicate medical data records from one healthcare provider station in response to a request from another healthcare provider station in the respective formats corresponding to the computer station identification codes for the healthcare providers.

The capability of the system 18 to bidirectionally communicate with the trading partners permits the medical transaction system 18 to receive data messages in the format specified for each trading partner and in accordance with the communication protocol for that trading partner. The data messages from the trading partners to the medical transaction system 18 include remittance and claim adjudication information from payors, electronic funds transfer messages to financial institutions, and medical data records from insurance carriers and medical service sites such as laboratories and the like. As explained in more detail below, the medical transaction system 18 uses the remittance and claim adjudication information from payors to generate the electronic fund transfer messages for debiting and crediting accounts at the financial institutions.

As explained in more detail below, the compiler of medical transaction system 18 also compiles remittance, payment, and medical history data from the data messages received from the healthcare providers and trading partners, and preferably organizes the compiled data in generic record formats for inclusion in a generic transaction database 20. The generic database 20 of the system 18 may provide a history of a claim submission, adjudication, and payment as well as a repository for medical data records which are transmitted through the medical transaction system. Preferably, an analyzer may be included in the medical transaction system 18 to statistically analyze the data within generic transaction database 20. The analyzer may provide additional statistical information such as which healthcare providers are being reimbursed for the full amount of their claims, which healthcare providers are having a significant number of claims rejected, and other financial information. Additionally, the claims and medical data records stored in the generic transaction database 20 may be analyzed to determine what demographic group requires the most medical visits, the most expensive treatments, or the like.

One advantage of the system 18 shown in FIG. 3 is that full communication is possible between healthcare providers, $P_1$ through $PN_1$, and trading partners, $TP_1$ through $TP_N$, that have completely different data message formats and communication protocols. Another advantage of such a system 18 is that the information passing through the system can be organized in generic data records independent of the data message formats which are being received by and transmitted from the medical transaction system. These generic data records include claim information, financial information, and medical history information, all of which are a valuable source of data for statistical analysis that may be used to improve the healthcare supplied by the providers and for which the insurance carriers pay.

Another advantage of the medical transaction system 18 of FIG. 3 is that there is no requirement for imposing a uniform claim format and uniform processing of the claim within the system. The medical transaction system of FIG. 3 is capable of communicating with a variety of data message formats and communication protocols. Such a system is capable of remedying an ill recently noted by the President of the United States that there is complete lack of a uniform medical claim in the United States. A system incorporating the present invention provides uniformity without imposing the costs of requiring the insurance carriers and the healthcare providers to use the same data format. Another advantage of the medical transaction system of FIG. 3 is the ability to provide a credit line for medical care at a financial institution that may be used by a patient to pay for those portions of a medical claim that are not covered by an insurance carrier's payment.

The medical transaction systems shown in FIGS. 1 through 3 are preferably performed by software executing on a Tandem CLX/R or Cyclone/R computer controlled by a GUARDIAN C30 operating system, Release Level 5. Such a computer and operating system are available from Tandem Computers Incorporated of Cupertino, Calif. As described in more detail below, the components of the medical transaction systems of FIGS. 1 through 3 include custom written software programs, discussed in more detail below, and commercially available programs that execute on the preferred computer running the preferred operating system. Preferably, the commercially available software is sold under the commercial name Engin by Muscato Corporation of Orlando, Fla., although other commercially available programs may be used.

While the preferred embodiment 18 executes on a single computer running a single operating system, the communication function could be segregated in one computer system that handles the communication protocol processing for the reception and transmission of data messages. After the communication protocol processing is completed, the communication computer could then transfer the data messages to another computer system executing a compiler program to compile information from the data messages and create the generic records, and an extractor program could extract selected ones of the generic records, format them to particular data formats and provide the formatted data messages to the communication computer for transmission to a healthcare provider or trading partner computer station.

Figure 4:
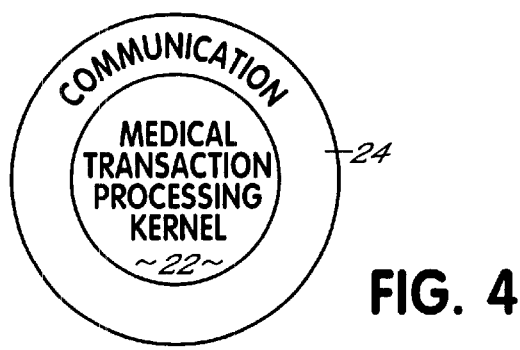
FIG. 4 is a diagram of the software functions of the medical transaction system.

The commercial and customized software of the preferred embodiment that executes on the computer platform for the medical transaction system 18 provides a medical transaction processing kernel 22 surrounded by a layer of communication software 24 as shown in FIG. 4. The communication layer 24 includes receiver and transmitter software that receives and transmits the data messages, recognizes the protocols by which the messages are received by and sent to the medical transaction system and handles the handshaking signals required to receive and send the data messages respectively. For received messages, the receiver of the communication layer 24 strips off the protocol specific elements and provides the data message in the format in which it was received to the medical transaction processing kernel 22. For transmitted messages, the kernel 22 provides formatted data messages to the transmitter of the communication layer 24 which supplies the protocol specific elements for a particular computer station and then transmits the data message to the computer station in the communication protocol that corresponds to that computer station.

The medical transaction processing kernel 22 of FIG. 4 processes a data message received from the communication layer 24 and organizes the data from the received data messages into records having a generic format. Periodically, the kernel 22 extracts the generic data records corresponding to a particular computer station, formats the information in the generic records into the data message format recognized by the computer station and supplies the formatted messages to the communication layer for transmission.

Figure 5:
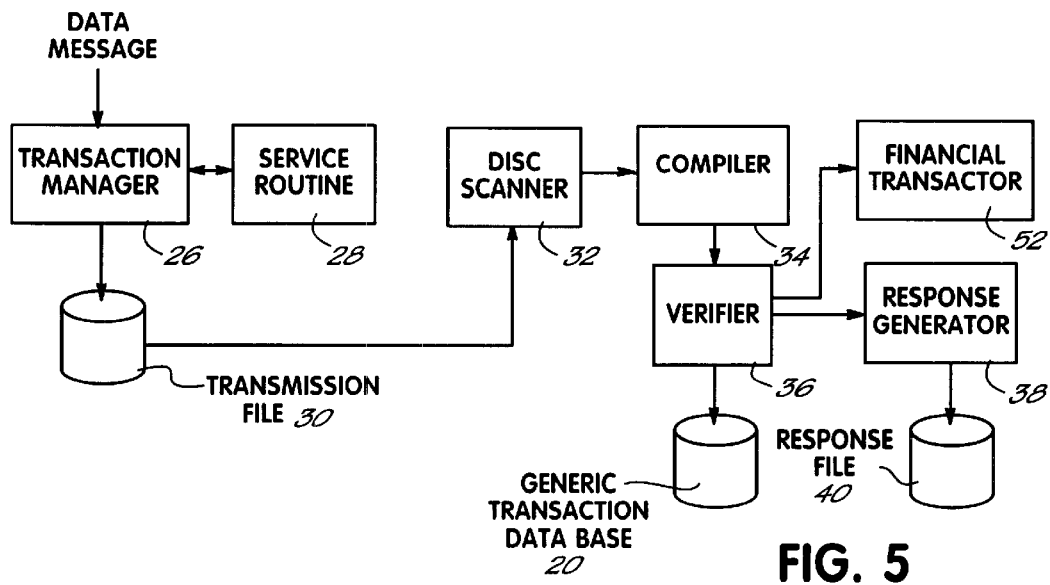
FIG. 5 is a block diagram showing the structure of the input process of the medical transaction system shown in FIG. 3.

The software components that accomplish the receipt of data messages from a computer station are shown in FIG. 5. Two of the components, the transaction manager receiver 26 and portions of the service routine 28, are associated with the communications layer 24 while the remaining portions of the service routine 28, disc scanner 32, compiler 34, verifier 36, response generator 38 and financial transactor 52 are associated with the medical transaction processing kernel 22. The service routine 28, compiler 34, verifier 36, response generator 38, and financial transactor 52 are preferably, custom software routines, preferably written in COBOL.

Broadly, the transaction manager receiver 26 handles the communication protocol and handshaking to receive a data message from a computer station and the service routine 28 performs a security function to determine whether the computer station communicating with the transaction manager receiver is an authorized station. After confirming the station is authorized, the transaction manager receiver 26 preferably stores the received data messages in a transmission file 30. Other functions needed to facilitate communication with the computer stations may be incorporated in service routine 28. Thus, portions of service routine are part of the communications layer 24 while other portions are part of the processing kernel 22.

Periodically, a disc scanner 32 reviews the transmission file to locate any received data messages that have not been processed by the complier 34. Upon finding such received data messages, the disc scanner 32 collects them from the transmission file 30 and supplies them to the compiler 34. The compiler retrieves the data from the data fields of the received data messages and organizes the data into a generic data record format. A verifier 36 checks the data fields within each generic data record to determine that the proper type of data is in each data field.

If the verifier 36 locates a generic data record that does not contain the proper type data within a data field, an error record is provided to a response generator 38 which converts the error record to a error message for transmission to the computer station that sent the erroneous message. Thus, a computer station may be informed that an improper data message has been received. The error message is stored in a response file 40 for later transmission. The verifier 36 also provides the verified generic data records and sufficient information to identify a data message that failed verification to the generic transaction database 20. If a verified generic record contains remittance information, verifier 36 collects the generic records necessary for the financial transaction to pay a provider and passes the records to the financial transactor 52 for processing which is discussed in more detail below.

A review of the input process of FIG. 5 shows the components that permit the medical transaction system to communicate with a plurality of computer systems that support different data message formats and different communication protocols. Such a system permits each healthcare provider and insurance carrier to use any of the data fields available in the ANSI 837 standard for medical claims. The system also permits the insurance carriers to utilize any of the data fields available in the ANSI 835 standard for remittance information. This latter capability provides the operator of such a system enormous flexibility in accommodating computer stations that utilize variations of the ANSI standards. Additionally, all the data from the differently formatted messages are compiled into generic data records to facilitate the retrieval and use of information within the received data messages.

In more detail, the receiver 26 portion of the transaction manager is capable of communicating with a computer station that utilizes any of the more commonly known communication protocols such as ASYNC, BISYNC, X.25, as well as other known protocols. Additionally, the transaction manager receiver 26 may be modified to include software and hardware that communicates with a proprietary communication protocol utilized by a computer station. Such modification is capable of being performed by one of ordinary skill in the art knowledgeable about the particular communication protocol.

Figure 6:
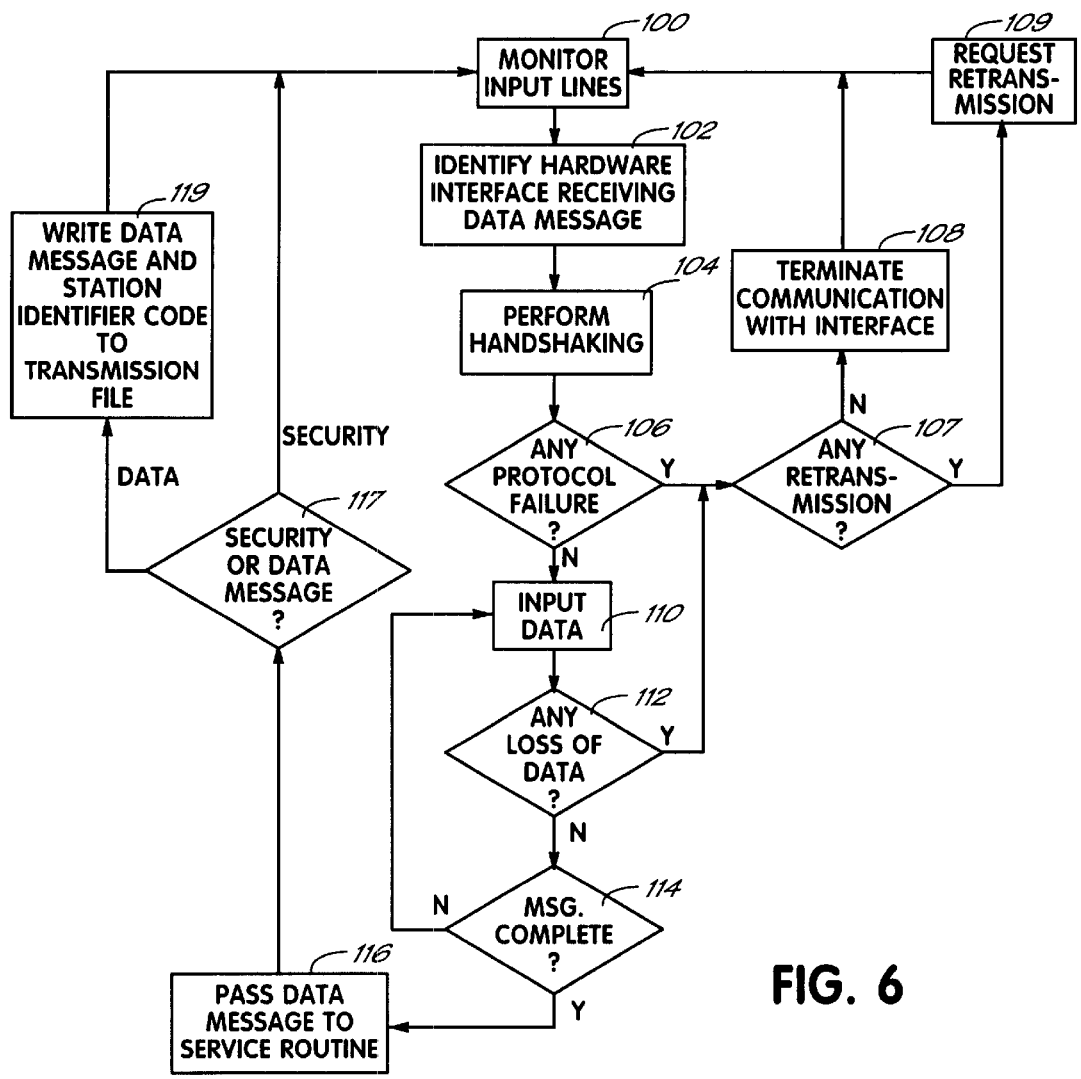
FIG. 6 is a flowchart of the processing within the receiver portion of the transaction manager of FIG. 5.

The processing performed by the transaction manager receiver 26 is shown in flow chart form in FIG. 6. The transaction manager receiver 26 begins by monitoring the status of the input lines to the medical transaction system. (Box 100). Once the transaction manager recognizes that a computer station is attempting to send data, the transaction manager identifies the hardware interface and the corresponding communication protocol being used to send the data message. (Box 102). Transaction manager receiver 26 continues by performing the requisite handshaking to communicate with the sending computer station. (Box 104). Should there be a loss of the handshaking signals, (decision box 106), transaction manager receiver 26 determines whether a retransmission should be requested. The retransmission request decision is based upon the retransmission parameters as defined by the protocol. For example, the number of retransmission requests may be compared to a predetermined limit and if the limit has been reached, communication is terminated, (Box 108), and receiver 26 returns to monitoring the input lines. (Box 100). Otherwise, a retransmission request is transmitted, (Box 109), to the station via the transmitter 46 and the response is awaited.

Having established the communication link with the computer station, the transaction manager receiver 26 inputs data from the computer station, (Box 110), and builds a received data message, (Box 110), until a complete data message has been received. (Box 114). If an insufficient amount of data is received to form a complete data message, (Box 112), communication is terminated, (Box 108), or a retransmission requested. (Box 109). Once a complete data message has been received, the transaction manager receiver 26 passes it to the service routine 28. (Box 116). Transaction manager receiver 26 determines if the service routine 28 is processing a security or data message, (for example, by checking the data and security message flags), and writes a complete data message to transmission file 30, (Box 119), or returns to monitoring the input lines for data messages, (Box 100). Both the data message and station identification code are preferably written to the transmission file 30. (Box 119).

Figure 7:
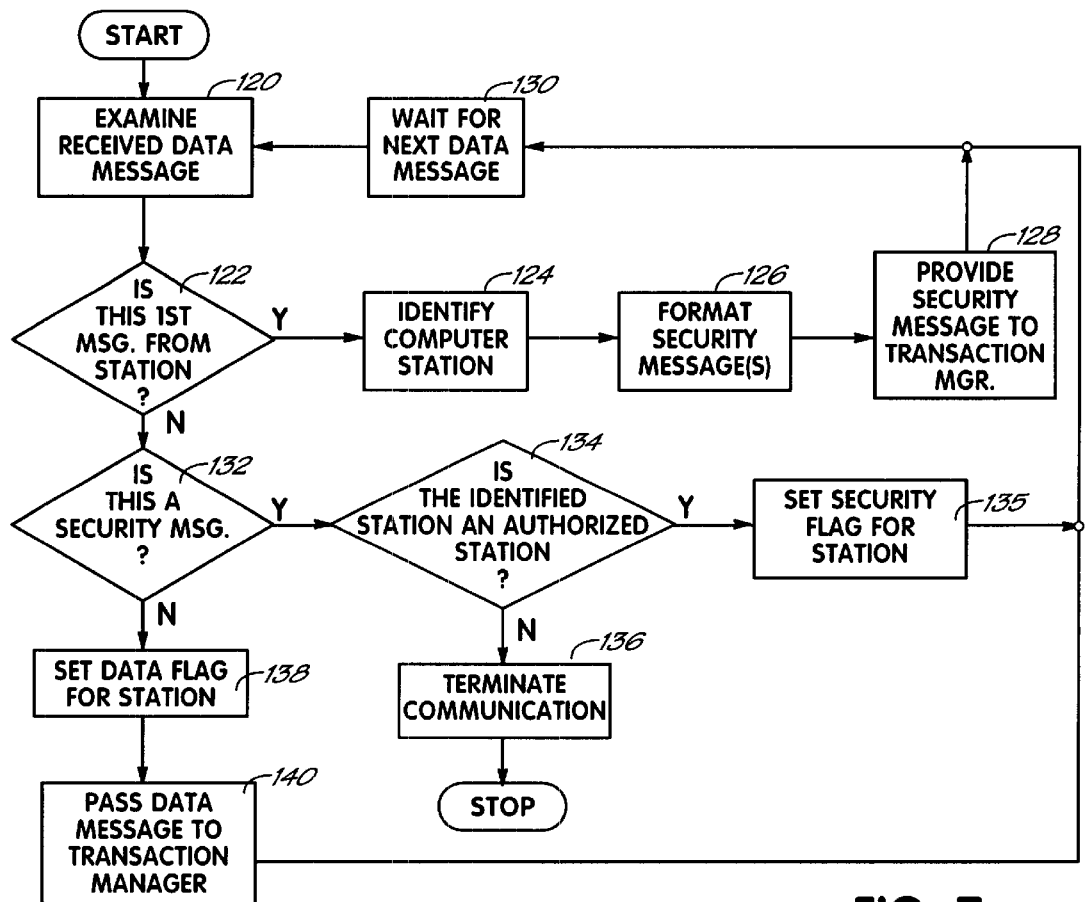
FIG. 7 is a flowchart of the processing within the service routine shown in FIG. 5.

The processing performed by the service routine 28 is shown in the flow chart of FIG. 7. After the data message received from the computer station is provided to service routine 28 by the transaction manager receiver 26, the service routine 28 examines the received data message, (Box 120), and, if the received data message is the initial one from a station, (Decision Box 122), routine 28 identifies the computer station from a computer station identification code within the received data message. (Box 124). For the initial message, service routine 28 formats a data message or messages, (Box 126), that request additional security information from the computer station. Alternatively, the initial message may contain security information which is processed to determine whether the station is authorized. The messages are provided to the transmitter 46 (FIG. 11) of the transaction manager, (Box 128), discussed in more detail below, which transmits the security message to the identified computer station. Service routine 28 then waits for the next message. (Box 130).

After the transaction manager receiver 26 has received the response to the security message and provided it to the service routine 28, routine 28 determines if the message is a security message response. (Decision Box 132). If it is, the security message is analyzed to determine if the identified computer station is an authorized computer station. (Box 134). If it is not, communication is terminated. (Box 136). If the station is authorized, the service routine 28 sets the security flag for the station, (Box 135), and waits for the next data message from the computer station. (Box 130). For a data message, service routine 28 sets a data flag, (Box 138), to indicate the message contains data (not security information) and returns the data message to the transaction manager receiver 26. (Box 140). Data messages are routed through the service routine 28 to provide the service routine with the opportunity to provide other generic communication functions, if any are needed.

In further detail, the transmission file 30 and disc scanner 32 utilized in the preferred embodiment of the medical transaction system form a data message buffer for the received data messages that are processed by the medical transaction processing kernel 22. Alternatively, the service routine 28 may provide the received data messages in real time to the compiler 34 and the transmission file 30 and disc scanner 32 may be eliminated from the input process. Such a process, however, requires that the compiler 34 be able to receive and compile information from the received data messages as quickly as they are produced by the service routine 28. The transmission file 30 and disc scanner 32 reduce the rate at which the compiler must process the data messages below the rate at which the service routine 28 may provide them.

Figure 8:
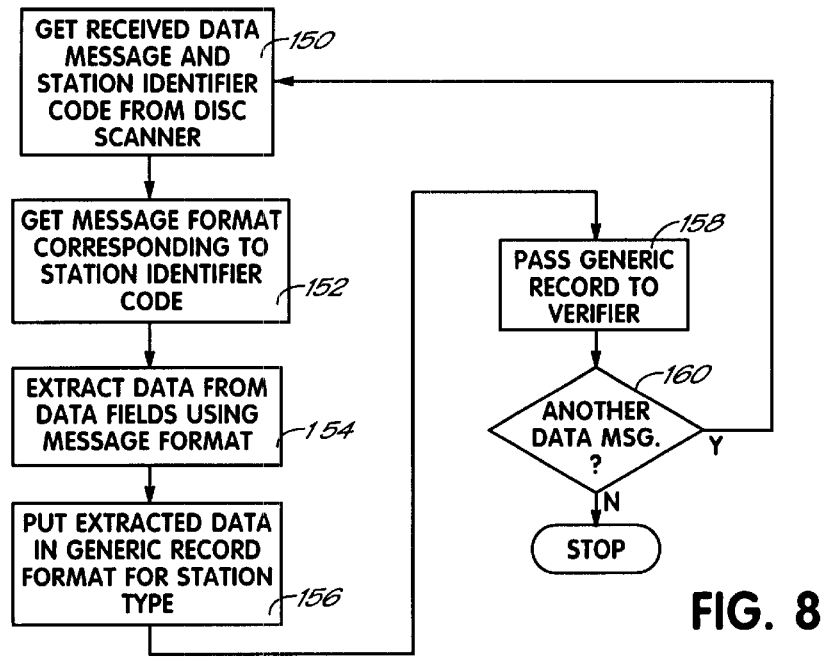
FIG. 8 is a flowchart of the processing of the compiler of FIG. 5.

In more detail, the compiler processing is shown in the flow chart of FIG. 8. The compiler 34 initiates its processing by taking a received data message and station identifier from the disc scanner 32, (Box 150), and retrieves the data message format for the received message by using the computer station identification code. (Box 152). The format is used to extract data from the received data message, (Box 154), and the extracted data is inserted into a generic data record that corresponds to the station identification code, (Box 156), which is passed to the verifier. (Box 158). The compiler 34 checks to see if there are any other data messages to process, (Decision Box 160), and if there are, the processing continues. If there are no other data messages to process, the compiler 34 terminates its processing.

The formats for the generic records preferably differ for the types of computer stations. That is, one type of generic format is used for a healthcare provider, such as a doctor, while another type of generic record format is used for another type of healthcare provider, such as a hospital. Likewise, the generic record formats for the various types of trading partners may also vary. Appendix A is attached hereto and is explicitly incorporated into this specification by reference. Appendix A shows the preferred generic record formats for the medical claim generic records and error records stored within the generic transaction database of the preferred embodiment. Appendix A also shows that the generic record formats contain some data fields that are common to all of the data message formats received by the system. These common data fields are organized in the generic records to facilitate the use of the records within the database. Preferably, the generic transaction database is written in SQL (Structured Query Language) which provides a generic structure for a relational database.

With further reference to Appendix A, the tables identified as AA0, BA0, BA1, CA0, CB0, DA0, DA1, DA2, EA0, EA1, I21, I34, I40, I41, I44, I50, I60, I61, I7A, I7B, I71, I72, I73, I74, I80, I81, FA0, FB0, FB1, GA0, GC0, GD0, GD1, GE0, GP0, GX0, GX1, GX2, and HA0 are record formats for data that may be within a data message containing a medical claim. Additionally, some of the data record formats are primarily used for data within a medical claim from an institution, such as a hospital, although a doctor may include such data within a medical claim. Record formats AA0RESP, BA0RESP, CA0RESP, and DA0RESP are the error record formats preferably used that contain the identifying information for an erroneous message. Comparing these record formats with those defined in tables AA0, BA0, CA0, and DA0 shows that most of the message identifying information comes from these four generic record formats. The generic record formats for the remittance records are preferably defined by the ANSI 835 standard as specified by the Health Care Financing Administration (HCFA) for Medicare claims. This specification is set forth in *Implementation Manual For The* 835 *Health Care Claim Payment/Advice* by James Moynihan, printed by Healthcare Financial Management Association (HFMA) of Westchester, Ill. 60154.

Figure 9:
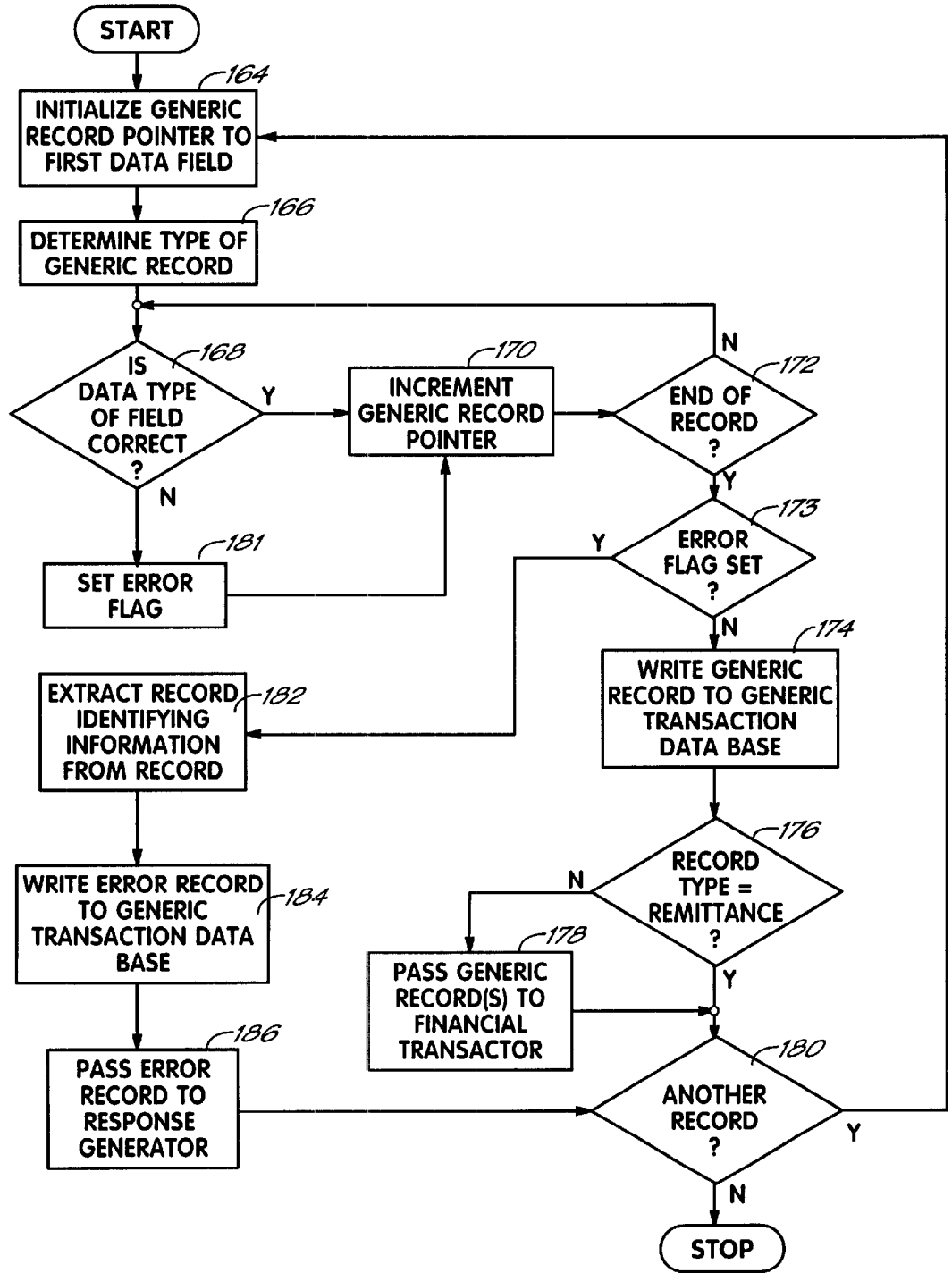
FIG. 9 is a flowchart of the processing of the verifier shown in FIG. 5.

The processing of the verifier 38 of the preferred embodiment is shown in further detail in the flow chart of FIG. 9. Verifier 36 begins by initializing a generic record pointer to the first data field of the generic record received from compiler 34. (Box 164). Verifier 36 determines the type of generic record being examined, (Box 166), so the data types for the fields may be checked. If the data type within the field to which the generic record pointer points is correct, (Decision Box 168), the generic record pointer is incremented so it points to the next data field in the record. (Box 170). If the end of the record has been reached, (Decision Box 172), the generic record is preferably written to the generic transaction database 20. (Box 174). Verifier 36 determines if the generic record contains remittance information from a trading partner station, (Decision Box 176), and if it does, verifier 36 collects the generic records necessary to pay a provider and passes the records to financial transactor 52 for processing. (Box 178). Verifier 36 then determines if there are more records to verify, (Decision Box 180), and if there are, processing continues. Otherwise, processing is terminated.

If an erroneous data type is detected, i.e., a character field has numeric data or vice versa, (Decision Box 168), an error flag is set, (Box 181), and the processing continues. (Box 170). At the end of the record, (Decision box 172), verifier 38 determines if the error flag is set. (Decision Box 173). If it is, the verifier 36 extracts information from the record to identify the record for error logging purposes. (Box 182). The message identifying information is placed in an error record that is written to the generic transaction database 20. (Box 184). The error record is also passed to response generator 38. (Box 186). Alternatively, verifier 38 may not pass the error record to response generator 38, but instead let response generator 38 retrieve them from the database 20. The verifier 36 determines whether the compiler 34 has another generic record for it to process, (Decision Box 180), and if it does, the data field testing is performed on the record. Otherwise, the verifier terminates its processing.

Figure 10:
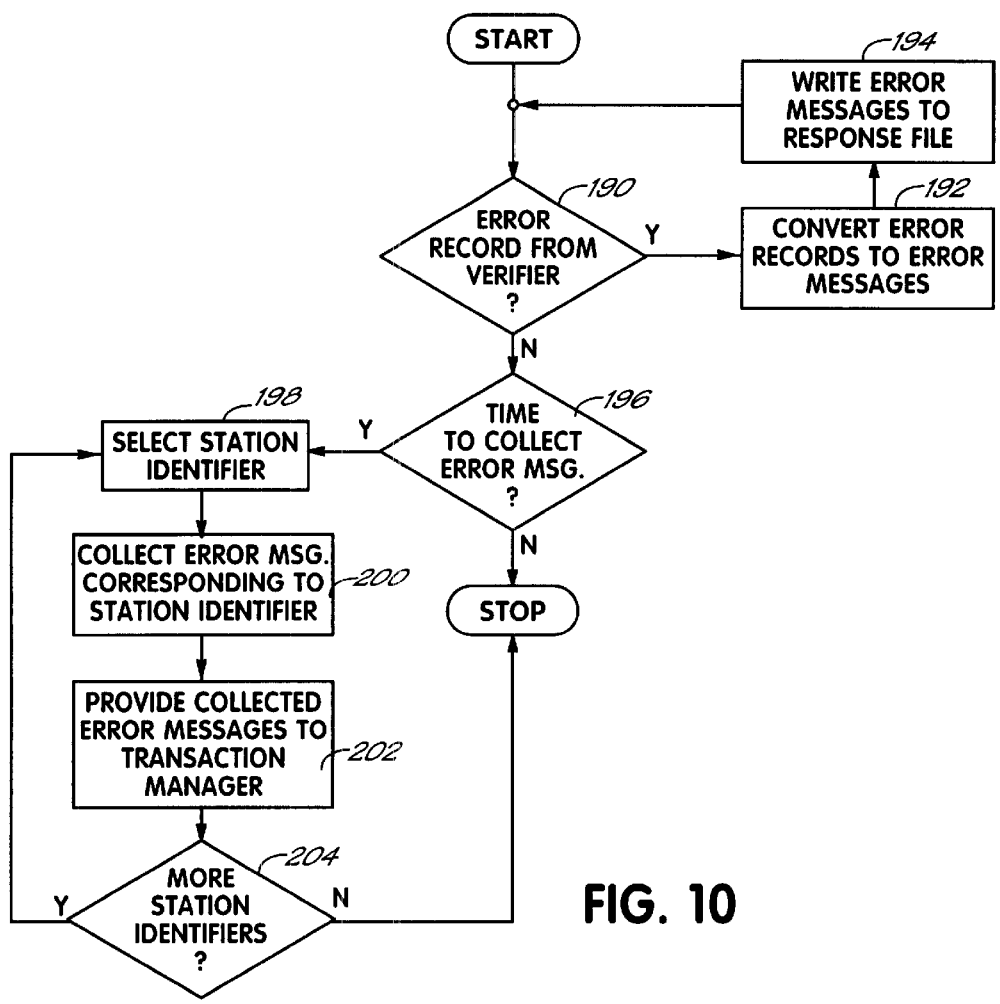
FIG. 10 is a flowchart of the processing of the response generator shown in FIG. 5.

The processing of the response generator 38 is shown in the flowchart of FIG. 10. Response generator 38 begins by determining if there are any error records from verifier 36. (Decisions Box 190). If there are, the error records are converted to error messages, each with a format corresponding to the computer station identifier, (Box 192), which are written to the response file 40. (Box 194). Processing continues by checking for more error messages. (Decision Box 190).

If there are no error messages to process, response generator 38 determines if it is time to collect error messages for transmission to computer stations. (Decision Box 196). If it is, a computer station identifier is selected, (Box 198), and the formatted error messages corresponding to the station identifier are collected from response file 40. (Box 200). The collected error messages are provided to transaction manager transmitter 46 (FIG. 11) for transmission to the computer station. (Box 202). If there are more station identifiers, (Decision Box 204), error message collecting continues. Otherwise, processing terminates. Alternatively, response generator 38 may periodically retrieve error records for a predetermined computer station identification code or series of such codes, convert the records to error messages, and supply the messages to the transmitter 46 for transmission to the corresponding station(s).

Figure 11:
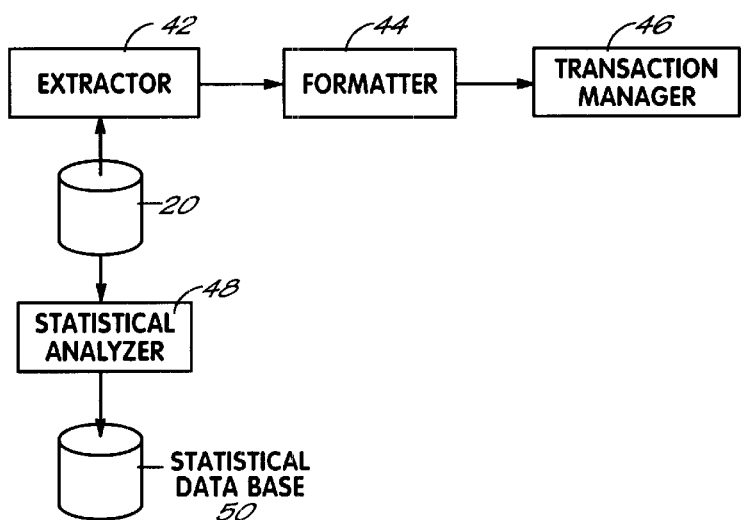
FIG. 11 is a block diagram of the output process of the inventive medical transaction system shown in FIG. 3.

The remaining components of the medical transaction process kernel are shown in FIG. 11. These components include an extractor 42 for extracting generic data records from the generic transaction database 20, a formatter 44 for reorganising the data from the generic data records into a format specific to a computer station, and the transmitter 46 portion of the transaction manager which provides the protocol specific elements for transmitting the formatted records to the computer station. The receiver 26 and transmitter 46 of the transaction manager form the communications layer 24, discussed above. The extractor 42 and formatter 44 are custom written software routines, preferably written in COBOL with embedded SQL commands. The extractor 42 and formatter 44 are components of the medical transaction processing kernel 22. Preferably, statistical analyzer 48, also a custom written SQL program is included to perform statistical analysis on generic transaction database 20, as discussed in more detail below, to produce a statistical database or report 50. Additionally, statistical analyzer 48 may be supplemented for more rigorous analysis, such as correlation, with commercially available statistical software.

Figure 12:
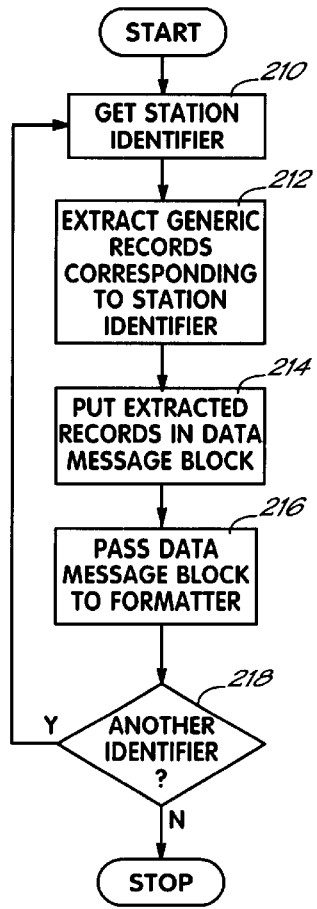
FIG. 12 is a flowchart of the processing of the extractor of FIG. 11.

The processing of the extractor 42 is shown in more detail in FIG. 12. The extractor routine is activated by receipt of an extract command that identifies a computer station. Preferably, the operating system activates the extractor routine at a predetermined time. Alternatively, a user at the medical transaction system could submit a request for generic data records corresponding to a particular computer station or a batch job could be submitted that is executed in due course by the operating system to activate the extractor routine. Once activated, the extractor 42 either retrieves the computer station identification code from the activation command or sequences through a predetermined set of station identification codes to extract records.

Once the extractor retrieves a computer station identification code, (Box 210), the generic records to be sent to that computer station are extracted from the generic transaction database 20. (Box 212). The extracted records are put in a data message block, (Box 214), to be sent to the computer station and the data message block is provided to the formatter 44. (Box 216). The extractor 42 determines whether another computer station identification code is available for processing, (Decision Box 218), and if it is, processing continues with the retrieval of the identification code for that station. Otherwise, the extractor 42 terminates its processing.

Figure 13:
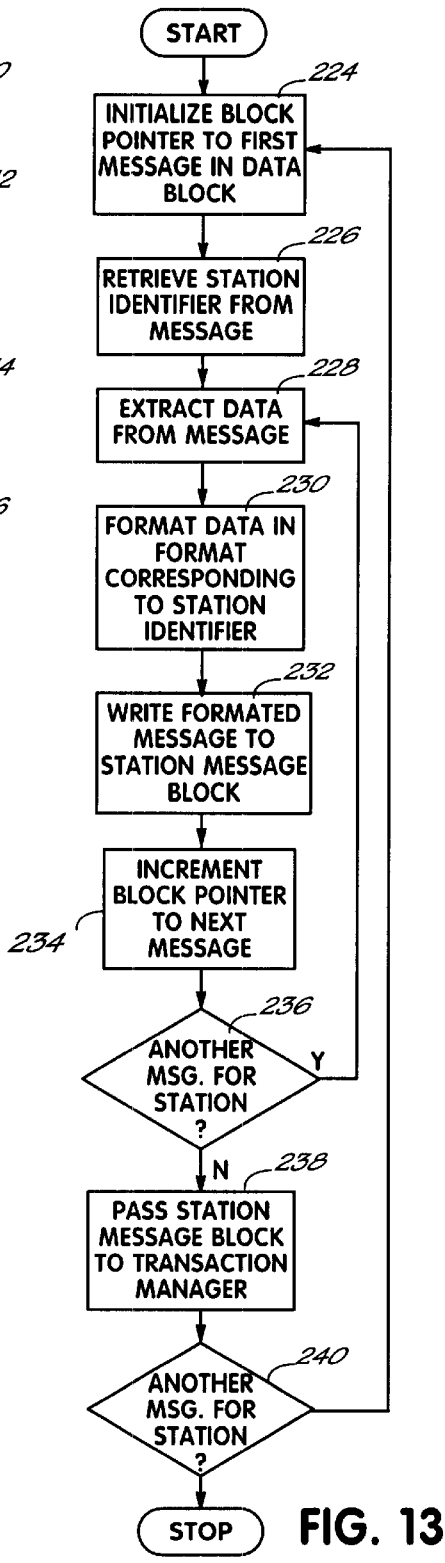
FIG. 13 is a flowchart of the processing of the formatter shown in FIG. 11.

The processing of the formatter 44 is shown in more detail in the flow chart of FIG. 13. The formatter 44 first initializes a block pointer to the location of the first message in a data block passed by extractor 42. (Box 224). Formatter 44 retrieves the station identifier from the message. (Box 226). After extracting information from the data message, (Box 228), the information is formatted in a format that corresponds to the computer station identifier, (Box 230), and is written to a station message block. (Box 232). The block pointer is incremented to the next message location, (Box 234), and if the formatter 44 determines that there is another message in the data block to format into the station message format, (Decision Box 236), processing of the message in the data message block continues. Otherwise, the station message block is provided to the transaction manager transmitter 46 for transmission to the computer station. The formatter 44 determines whether another data message block is available from the extractor 42, (Decision Box 240), and if it is, initializes the block pointer to the first message in the block and the processing continues. Otherwise, processing for the formatter 44 terminates.

Figure 14:
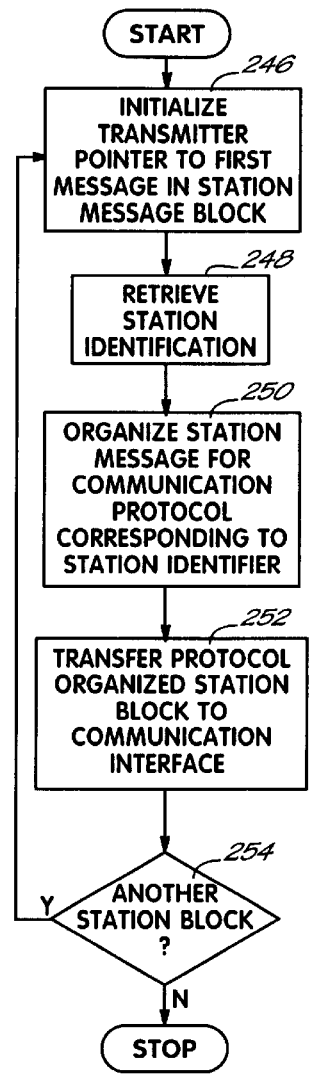
FIG. 14 is a flowchart of the processing of the transmitter portion of the transaction manager shown in FIG. 11.

The transmitter 46 of the transaction manager is shown in more detail in FIG. 14. After the formatter 44 provides the station message block to the transaction manager 46, the transaction manager initializes a transmitter pointer to the first message in a station message block, (Box 246), and retrieves the station identification code, (Box 248), to determine the communication protocol for the computer station. Any protocol specific elements that must be added to the data message block for transmission to the computer station are inserted in the station message block. (Box 250). The transaction manager transmitter 46 selects the hardware interface for transmission of the data block to the computer station and transfers the protocol organized message block to the hardware interface for the protocol corresponding to the computer station. (Box 252). The transaction manager transmitter 46 determines whether another station block is available for transmission, (Decision Box 254), and if it is, processing of the next station message block continues. Otherwise, the transaction manager transmitter 46 terminates processing.

Preferably, the processing components of FIG. 11 also include a statistical analyzer 48. This analyzer, either periodically or under explicit command from a terminal associated with the computer platform executing the medical transaction system 18, performs statistical data analysis on the information within the generic data records of the generic transaction database 20. Preferably, the statistical analyzer 48 uses the information in the generic data records to produce reports containing information such as the outcomes for particular types of diagnosis, identification of particular medical protocols prescribed for particular conditions, analysis of medical treatment by demographic or by geographical constraints, or analysis of financial data such as the costs charged for a particular medical protocol or the like. Other types of statistical analysis of such a database would be apparent to one of ordinary skill in the art.

In the preferred embodiment of the medical transaction system 18, the receiver 26 of the transaction manager includes the protocol information corresponding to the trading partners. This information is used to perform the handshaking and security functions with the trading partners so messages may be received from the trading partners. Thus, the computer stations referenced in the processing blocks of FIG. 7 include the computer stations associated with the trading partners.

The compiler 34 of the preferred embodiment also includes data message format information regarding the data messages transmitted by the trading partners. Particularly, the compiler 34 includes information regarding the parsing of the remittance information provided in such data messages. This remittance and claim adjudication information is organized into a generic data record format for a trading partner station that is preferably included in the generic transaction database 20. Likewise, verifier 36 identifies the generic records for each type of computer station and verifies the data fields for each type of record. Similarly, response generator 38 generates error messages for data messages received from trading partners that are stored in the response file and the error messages for the trading partners are periodically collected for transmission to inform them of erroneously transmitted messages.

The extractor 42 of the preferred embodiment further includes the retrieval of computer station identification codes for healthcare providers so generic data records corresponding to the healthcare provider stations may be extracted. The formatter 44 of the preferred embodiment further includes the message data formats for data messages that contain information about the adjudication of a submitted claim. With this information, the formatter 44 formats message data blocks for a healthcare provider that is transmitted by the transaction manager transmitter to the computer station of a healthcare provider. Thus, the preferred embodiment provides a complete data communication path from the healthcare providers to the trading partners and from the trading partners to the healthcare providers.

One of ordinary skill in the art understands the communication path provided through the preferred embodiment of the medical transaction system 18 also permits one healthcare provider to communicate with another healthcare provider. Such a communication path would permit a healthcare provider to retrieve medical history from another healthcare provider, such as a referring physician. Thus, the preferred embodiment of the system is capable of providing medical data information in a system that is also capable of processing medical claims.

The preferred embodiment of the medical transaction system may also include the financial transactor 52 as shown in FIG. 5. Once, a data message containing remittance information is received from a trading partner, the verifier 36 provides the generic data record to the financial transactor 52. The financial transactor 52 processes the remittance information to generate electronic funds transfer messages that are put in a message data block along with a computer station identification code that identifies a financial institution. The formatter 44 formats the message data block into a station message block for the trading partner as discussed previously. The station message block is provided to the transaction manager which transmits the messages to the specified trading partner. In this manner, the financial transactor 52 generates the data messages that are transmitted to the financial institutions for crediting and debiting accounts in accordance with the claim adjudication and remittance information provided by the trading partners that are insurance carriers.

Figure 15:
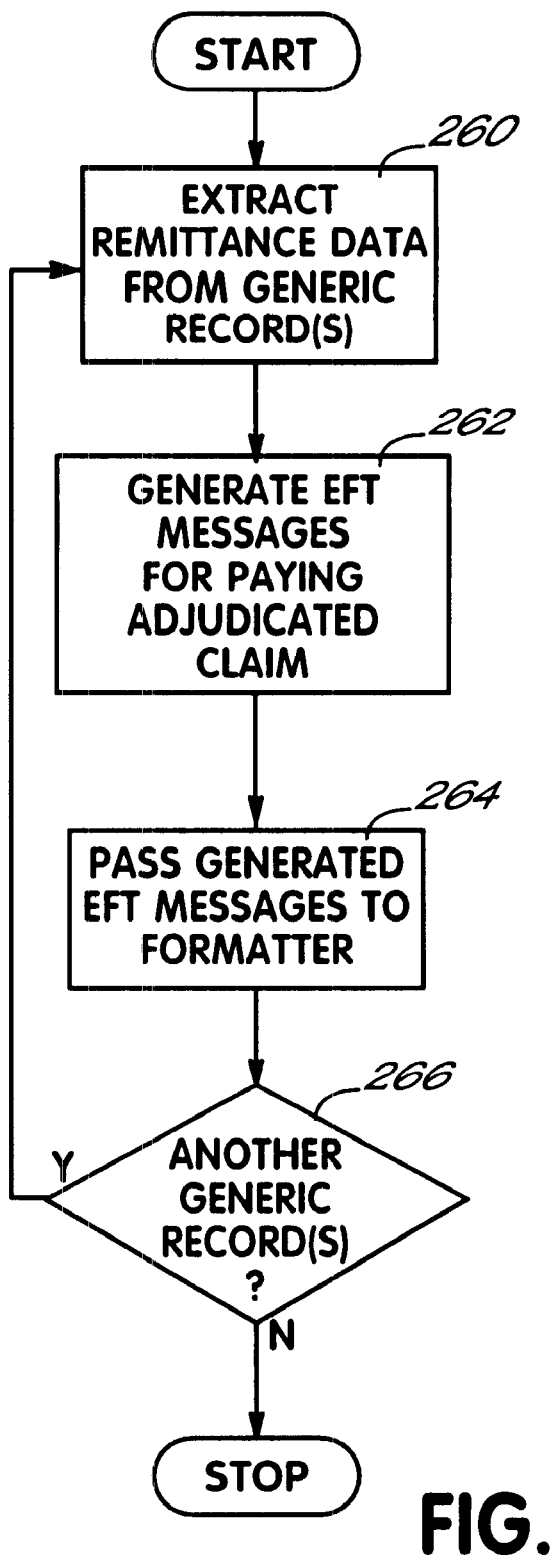
FIG. 15 is a flowchart of the processing of the financial transactor shown in FIG. 5.

The processing of the financial transactor 52 is shown in FIG. 15. Transactor 52 begins by extracting remittance information from the generic record(s) passed to it by verifier 36. (Box 260). The remittance information is used to generate the electronic funds transfer messages (EFTs), (Box 262), that result in accounts being credited and debited at the financial institutions that are trading partners so the claims are paid. Additionally, any other messages responsive to remittance information or financial institution information received from a trading partner are generated. The EFTs and related messages are provided to formatter 44, (Box 264), for formatting in the data message format that corresponds to the computer station identification codes for the computer stations at the financial institutions designated for the EFTs and related messages. Currently, the data message format for the messages to the financial institutions are the same since the financial institutions communicate with each other through a computer system called a clearinghouse that imposes the same format on all of its users. However, the system of the present invention contemplates formatting data messages to the financial institutions as they differ from one another. If there are no other generic records to process, (Decision Box 266), processing terminates. Otherwise, financial transactor 52 continues processing the records.

As can be understood from the operation of the preferred embodiment of the medical transaction system 18, the invention couples a plurality of healthcare providers to a plurality of payors and financial institutions. The system 18 provides communication paths to the computer station of each of these various parties. This communication capability is achieved by the system's capability to translate between the data message formats and communication protocols of the trading partners and healthcare providers.

A further advantage of the medical transaction system 18 is its capability of extracting information from the data messages passing through it and accumulating this information in generic data message formats. The storage of these generic data message records in the generic transaction database 20 permits a statistical analyzer to generate statistical information that is not insurance carrier specific. Rather, the statistical analysis can cut across a number or selected subgroup of the payors or healthcare providers. The information from such a statistical analyzer is extremely beneficial in understanding healthcare costs and developing ways to contain such costs. One of ordinary skill in the art is capable of developing such a statistical analyzer.

The ability of the medical transaction system to communicate with financial institutions provides a further advantage to the medical transaction system 18 of FIG. 5. In a more preferred embodiment of the invention, one or more of the financial institutions extends credit lines solely for the purpose of medical claims to the patients of the healthcare providers. When such a credit line is available at one of the trading partners, the financial transactor 52 of the preferred embodiment further determines whether the remittance information from a payor fully covers a submitted medical claim. If it does not, the financial transactor 52 generates the credit authorization messages that are transmitted to a trading partner station located at a credit processor or financial institution, where the medical credit line is managed and processed, to determine whether the credit line has the remaining amount of the claim available. The credit processor or financial institution responds with data messages that indicate whether the credit is available for the remainder of the claim, and, in response, the financial transactor 52 generates the credit and debit messages that cover the remainder of the medical claim.

While the present invention has been illustrated by description of several embodiments and while the illustrative embodiments have been described in considerable detail, it is not the intention of applicants to restrict or in any way limit the scope of the appended claims to such detail. Additional advantages and modifications will readily appear to those skilled in the art. For example, verifier 36 may test certain data fields to determine if the data within the field is accurate as long as the test does not require the use of historical data, e.e., eligibility files or the like. The invention in its broader aspects is therefore not limited to the specific details, representative apparatus and methods, and illustrative examples shown and described. Accordingly, departures may be made from such details without departing from the spirit or scope of applicants' general inventive concept.

Having described our invention, we claim:

1. A medical transaction system for communicating data messages between a plurality of computer stations located at healthcare providers and payors, comprising:

a communication receiver for receiving data messages related to patient care activities performed by said healthcare providers, said messages received from said computer stations at said healthcare providers in a plurality of formats and protocols recognized by said communications receiver;

a compiler for compiling patient care information from said data messages received from said computer stations to form a plurality of patient care records having a single common format that is independent of at least one of said plurality of formats and protocols recognized by said communication receiver;

an extractor for extracting ones of said patient care records in accordance with a computer station identification code;

a formatter for formatting said extracted patient care records in a format corresponding to said computer station identification code; and a communications transmitter for transmitting said formatted patient care records to said computer station identified by said identification code in a format and protocol recognized by said identified computer station.

2. The system of claim 1 further comprising:

a verifier for verifying data fields within said data messages received from said computer stations and generating an error record indicating at least one data field within one of said received data messages failed verification.

3. The system of claim 2 wherein said verifier generates a patient care transaction database, said patient care transaction database including all said data fields of said verified data messages and identifying information for said data messages that failed verification.

4. The system of claim 3 further comprising:

an analyzer to generate statistical data from said patient care records in said patient care transaction database.

5. The system of claim 3 further comprising:

a financial transactor for generating electronic funds transfer messages in response to remittance information in said patient care records received from said computer stations located at said payors;

said formatter formats said electronic funds transfer messages in a format corresponding to a computer station identification code for a computer station located at a financial institution; and said communications transmitter transmits said formatted electronic funds transfer messages to said computer station identified by said computer station identification code in accordance with a protocol corresponding to said computer station identification code.

6. The system of claim 5 wherein said electronic funds transfer messages include a debit message for debiting an account at a financial institution.

7. The system of claim 6 wherein said account is a medical health credit line account.

8. The system of claim 5 wherein said formatter formats said electronic funds transfer messages in format corresponding to a financial institution computer station identification code.

9. The system of claim 1 wherein said formats for said data messages communicated by a group of said computer stations correspond to one of an ANSI 835 and ANSI 837 formats.

10. The system of claim 1 wherein said communication receiver receives data messages indicating a medical claim by a healthcare provider from said computer stations located at said healthcare providers, said data messages having a format and protocol corresponding to a computer station identification code for said healthcare provider submitting a medical claim;

said compiler compiles claim information from said received data messages, and;

said communication transmitter transmits said compiled claim information to said computer stations located at said payors in accordance with a communication protocol and format corresponding to a computer station identification code for said payor to which a medical claim is being submitted.

11. The system of claim 10 wherein said compiler formats said compiled claim information in a patient care record having a single common format that is independent of all of said plurality of formats and protocols recognized by said communication receiver.

12. The system of claim 11 further comprising:

an analyzer to generate statistical data from said patient care records.

13. A medical transaction system for communicating data messages with a plurality of computer stations comprising:

a communications receiver for receiving data messages related to patient care activities performed by healthcare providers, said messages received from a first plurality of computer stations at said healthcare providers, said data messages having a plurality of pre-defined formats and protocols recognized by said communications receiver;

a compiler for compiling patient care information from said received data messages to form a plurality of patient care records having a single common format that is independent of at least one of said plurality of formats and protocols recognized by said communications receiver;

an extractor for extracting a portion of said compiled patient care information for transmission;

a formatter for formatting said extracted patient care information in a predetermined format and protocol; and a communications transmitter for transmitting said formatted patient care information to a second plurality of computer stations, said transmitted information having a format and protocol different than said formats and protocols of said received data messages.

14. The system of claim 13 wherein said transmitted information has a plurality of formats and protocols.

15. The system of claim 13 wherein said transmitter transmits transmitted information to said first plurality of computer stations in said formats and protocols for said data messages.

16. The system of claim 15 wherein said receiver receives messages from said second plurality of computer stations.

17. The system of claim 16 wherein said transmitted information has a plurality of formats and protocols.

18. A medical transaction system for communicating medical data messages comprising:
   a communication layer for communicating data messages related to patient care activities performed by healthcare providers with a plurality of computer stations, said data messages being communicated in a plurality of communication protocols and being formatted in a plurality of data message formats recognized by said communication layer; and
   a medical transaction processing kernel for compiling patient care information from data messages received from said computer stations at said healthcare providers in different formats and different communications protocols, generating patient care records having a single common format that is independent of at least one of said plurality of formats and protocols recognized by said communication layer, and extracting a portion of said compiled patient care information for transmission to said computer stations.

19. The system of claim 18, said communication layer including:
   a transaction manager for receiving and transmitting said data messages in said plurality of communication protocols.

20. The system of claim 18, said communications layer further comprising:
   a service routine for generating data messages requesting security information from one of said computer stations communicating with said communication layer and terminating communication between said communication layer and said one of said computer stations in response to determining said computer station is unauthorized to communicate with said communication layer.

21. The system of claim 18, said medical transaction processing kernel further comprising:
   a compiler for compiling patient care information from said data messages received from said computer stations and for formatting said compiled information into a patient care record;
   an extractor for extracting selected ones of said patient care records corresponding to a computer station identification code; and
   a formatter for formatting said extracted patient care records in a format corresponding to said computer station identification code.

22. The system of claim 21, said kernel further comprising:
   a financial transactor for examining remittance information contained within a patient care record generated by said compiler, said financial transactor for generating electronic funds transfer data messages in response to said remittance information, said financial transactor for formatting said electronic funds transfer data messages in a format corresponding to one of said computer station identification codes.

23. The system of claim 22 wherein at least one of said computer stations is located at one of a credit processor and financial institution, said financial institution and credit processor for managing and processing credit lines for medical services secured to individuals, and
   said financial transactor generates credit authorization messages for requesting whether sufficient credit is available to cover a portion of a medical claim not paid by an insurance carrier and generating electronic funds transfer messages in response to said credit processor and financial institution transmitting a data message to said system that credit is available to pay said uncovered portion of said medical claim.

24. The system of claim 18 wherein a group of computer stations within said plurality of computer stations are located at a plurality of healthcare providers and payors, of at least two of said computer stations at said healthcare providers and at least two of said computer stations at said payors communicate with said communications layer in an ANSI 837 format.

25. The system of claim 24 wherein said two of said computer stations at said healthcare providers format said data messages within said ANSI 837 format differently.

26. The system of claim 24 wherein said two of said computer stations at said payors format said data messages within said ANSI 837 format differently.

27. The system of claim 18 wherein a group of computer stations within said plurality of computer stations are located at a plurality of financial institutions and payors, at least two of said computer stations at said payors communicate with said communications layer in an ANSI 835 format.

28. The system of claim 27 wherein said two of said computer stations at said payors format said data messages differently from one another.

29. The system of claim 27 wherein said two of said computer stations at said financial institutions format said data messages differently.

30. A method for communicating medical transactions between a plurality of computer stations, some of said computer stations being located at healthcare providers and some of the said computer stations being located at payors, said method comprising:
   communicating data messages related to patient care activities performed by healthcare providers with said plurality of computer stations at said healthcare providers and said payors in a plurality of data message formats and in a plurality of communication protocols; and
   processing data messages received from said computer stations at said healthcare providers in different formats and different communications protocols to compile patient care information from said received data messages and to generate patient care records having a single common format that is independent of at least one of said plurality of formats and protocols, and extracting a portion of said compiled patient care information to generate data messages for transmission to said computer stations.

31. The method of claim 30, said communicating step further comprising:
   receiving data messages from said plurality of computer stations in a plurality of data message formats; and
   transmitting data messages to said plurality of said computer stations in a plurality of data message formats and communication protocols.

32. The method of claim 31, said receiving step further comprising:
   collecting data messages communicated from said plurality of computer stations at a first rate; and providing said collected data messages to said compiling step at a rate less than said collecting rate.

33. The method of claim 30, said communicating step further comprising:

securing said communication with said computer stations so said communication only occurs with authorized computer stations.

34. The method of claim 33, said securing communication step further including:

generating messages requesting security information from one said plurality of said computer stations with which communication is being established;

determining whether data messages received from said one of said plurality of computer stations in response to said data messages requesting security information indicates said one of said plurality of computer stations is authorized for communication; and terminating said communication with said one of said plurality of computer stations in response to determining said one computer station is unauthorized for communication.

35. The method of claim 34, said processing step further comprising communicating with at least two of said computer stations in a ANSI 837 format.

36. The method of claim 35, said processing step further comprising:

communicating with said at least two computer stations in said ANSI 837 format differently.

37. The method of claim 34, said processing step further comprising:

communicating with at least two of said plurality of computer stations in an ANSI 835 format.

38. The method of claim 37, said processing step further comprising:

communicating with said two of said plurality of said computer stations in said ANSI 835 format differently.

39. The method of claim 30, the processing step further comprising:

compiling information from data messages received from said plurality of computer stations;

formatting said compiled information into patient care records;

extracting ones of said patient care records that correspond to a computer station identification code; and formatting said extracted patient care records in a data message format corresponding to a computer station identification code.

\* \* \* \* \*

UNITED STATES PATENT AND TRADEMARK OFFICE
CERTIFICATE OF CORRECTION

PATENT NO. : 6,453,297 B1
DATED : September 17, 2002
INVENTOR(S) : Burkes et al.

It is certified that error appears in the above-identified patent and that said Letters Patent is hereby corrected as shown below:

Column 7,
Line 58, delete "through $PN_1$, and", insert -- through $P_N$, and --.

Column 9,
Line 37, delete "complier 34", insert -- compiler 34 --.

Column 17,
Line 10, delete "data, e.e., eligibility", insert -- data, i.e., eligibility --.

Column 20,
Line 14, delete "payors, of at", insert -- payors, at --.

Column 21,
Line 11, delete "from one said", insert -- from one of said --.

Signed and Sealed this

Ninth Day of May, 2006

JON W. DUDAS
*Director of the United States Patent and Trademark Office*